(12) United States Patent
Ayadat

(10) Patent No.: US 12,102,026 B1
(45) Date of Patent: *Oct. 1, 2024

(54) FLY ASH TREATMENT METHOD FOR EXPANSIVE SOIL

(71) Applicant: Prince Mohammad Bin Fahd University, Dhahran (SA)

(72) Inventor: Tahar Ayadat, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,675

(22) Filed: Mar. 9, 2024

Related U.S. Application Data

(63) Continuation of application No. 18/474,908, filed on Sep. 26, 2023, now Pat. No. 11,980,117.

(51) Int. Cl.
*A01B 79/02* (2006.01)
*C09K 17/04* (2006.01)
*C09K 17/16* (2006.01)

(52) U.S. Cl.
CPC ............ *A01B 79/02* (2013.01); *C09K 17/04* (2013.01); *C09K 17/16* (2013.01)

(58) Field of Classification Search
CPC ........ E02D 31/002; C09K 17/04; C09K 17/16
USPC ... 405/128.1, 128.45–128.55, 128.7–128.85, 405/263, 264, 266, 302.4
See application file for complete search history.

(56) References Cited

U.S. PATENT DOCUMENTS

| 4,328,037 A * | 5/1982 | Demirel et al. ........ C04B 12/02 106/DIG. 1 |
| 2010/0028087 A1 | 2/2010 | Wissmann |
| 2016/0215208 A1 | 7/2016 | Monastiriotis et al. |

FOREIGN PATENT DOCUMENTS

| CN | 108385662 A | 8/2018 |
| CN | 110291172 | 9/2019 |
| CN | 111139078 B | 3/2021 |
| EP | 0863961 B1 | 1/2005 |
| EP | 3 569 591 | 11/2019 |

(Continued)

OTHER PUBLICATIONS

Inamdar et al. ; Comparative Study on Stabilization of Shedi Soil using Sulphur Sludge and Silica Fume ; International Journal for Innovative Research in Science & Technology, vol. 5, Issue 1 ; Jun. 2018 ; 6 Pages.

(Continued)

*Primary Examiner* — Tara Mayo
(74) *Attorney, Agent, or Firm* — Oblon, McClelland, Maier & Neustadt, L.L.P.

(57) ABSTRACT

A method for treating expansive soils includes excavating a hole in a superficial expansive soil layer from an excavation site to form the hole and an expansive soil material. Further, the expansive soil material is mixed with an inert material, at least two chemical additives, and a binder to form an additive soil material. The additive soil material is further poured into the hole in the excavation site to form an additive soil layer. The inert material is a sand, the chemical additives are a sulfur and a silica fume, and the binder is a dicyclopentadiene. The sand and the sulfur are present in the additive soil material in an amount from 30 wt. % to 40 wt. % and 12 wt. % to 25 wt. %, respectively, based on a total weight of the additive soil material.

14 Claims, 4 Drawing Sheets

(56) References Cited

FOREIGN PATENT DOCUMENTS

FR  2572723 A1 * 5/1986
IN  201941054579    1/2020

OTHER PUBLICATIONS

Singh et al. ; Effect of silica fume on engineering properties of expansive soil ; Materials Today: Proceedings, vol. 33, Part 8 ; Dec. 24, 2020 ; Abstract Only ; 3 Pages.
Devarajan ; Enhancement of Expansive Soil with Addition of Wood Husk Ash and Silica Fume ; International Journal of Innovative Technology and Exploring Engineering, vol. 9, Issue 2 ; Dec. 2019 ; 5 Pages.

* cited by examiner

FLY ASH TREATMENT METHOD FOR EXPANSIVE SOIL

CROSS-REFERENCE TO RELATED APPLICATIONS

The present application is a Continuation of U.S. application Ser. No. 18/474,908, now allowed, having a filing date of Sep. 26, 2023.

BACKGROUND

Technical Field

The present disclosure is directed to geotechnical applications, particularly to a stabilization method for treating expansive soils with a chemical additive.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Soils that exhibit volumetric fluctuations due to changes in their moisture content are referred to as expansive soils. The expansive soil has the ability to shrink or swell due to changes in the environment and moisture migration. Expansive soils are a worldwide problem, causing more damage to structures, particularly light buildings and pavements, than any other natural hazard, including earthquakes and floods. The presence of expansive soils on construction sites is problematic in a geotechnical engineering which is a branch of civil engineering concerned with the engineering behavior of earth materials.

The volume instability of expansive soils is influenced by several factors which can also be referred to as a behavior of soil. The factors affecting the behavior of soil are its mineralogy, clay content, fabric structure, moisture content, density, pore water chemistry, and loading conditions. Often, such soils cause substantial damage to civil engineering constructions due to alternating cycles of swelling and shrinkage. The swelling and shrinkage cause devastating effects on construction projects as the foundation is not strong enough to hold the building.

Conventionally, when the soil at any particular site cannot provide stability and serviceability to a proposed structure, potential remedial measures may be considered such as (a) to avoid the site, (b) alter a foundation design, (c) replace problematic soil with a high strength non-swelling soil, and (d) modify the existing soil through ground improvement techniques so as to create a new material capable of meeting the desired requirements. Although all the above methods have been tried in the case of expansive soils, options (c) and (d) are widely adopted by practicing engineers. Option (d), which is to improve the soil through ground improvement technique, is popularly known as soil stabilization. The replacement of problematic soil with better-quality borrowed soil may increase construction cost significantly. In view of option (d), modification through soil stabilization is an alternate choice that has been receiving engineers' attention over the years.

Soil stabilization technique depends on several factors, including economic, practical, and environmental considerations. Various stabilization techniques including chemical, thermal, and additive stabilization are known; however existing techniques are unable to provide stabilization of expansive soils efficiently and cost effectively. Therefore, there is an unmet need to overcome the shortcomings of the existing techniques and provide a method that can overcome instability of the expansive soils. Thus one object of the present disclosure is to provide a method for stabilizing expansive soils.

SUMMARY

In an exemplary embodiment, a method for treating expansive soils is described. The method includes excavating a hole in a superficial expansive soil layer from an excavation site to form the hole and provide an expansive soil material. Further, the method includes mixing the expansive soil material with an inert material, at least two chemical additives, and a binder to form an additive soil material. The method further includes pouring the additive soil material into the hole in the excavation site to form an additive soil layer. The additive soil material is poured in layered increments from 25 centimeters (cm) thick to 100 cm thick. The inert material is a sand, and the sand is present in the additive soil material in an amount from 30 weight percentage (wt. %) to 40 wt. % based on a total weight of the additive soil material. The at least two chemical additives are a sulfur and a silica fume. The sulfur is present in the additive soil material in an amount from 12 wt. % to 25 wt. % based on the total weight of the additive soil material. The binder is a dicyclopentadiene.

In some embodiments, the pouring of the additive soil material is conducted in the absence of water.

In some embodiments, the excavating forms the hole having a depth of from 1 meter (m) to 6 m.

In some embodiments, the method further comprises heating the additive soil material in a temperature range from 115 degrees centigrade (° C.) to 140° C. before the pouring of the additive soil material in the hole.

In some embodiments, the silica fume and the dicyclopentadiene are present in a combined amount of from 35 wt. % to 60 wt. % based on the total weight of the additive soil material.

In some embodiments, the dicyclopentadiene binder is added to the sulfur chemical additive during the mixing of the additive soil material.

In some embodiments, the dicyclopentadiene binder is added to the sulfur chemical additive once the sulfur chemical additive is molten in a temperature range from 115° C. to 140° C.

In some embodiments, the sulfur is present in the additive soil material in an amount of 25 wt. % based on the total weight of the additive soil material.

In some embodiments, the inert sand material has a particle size ranging from 0.07 millimeters (mm) to 2 mm.

In some embodiments, the inert sand material does not include hygroscopic salts, clay, silt, and organic matter.

In some embodiments, the silica fume is undensified.

In some embodiments, the silica fume has a first phase, in which silicon dioxide ($SiO_2$) is present in the silica fume in an amount from 80 wt. % to 90 wt. % based on a total weight of the silica fume, aluminum oxide ($Al_2O_3$) is present in the silica fume in an amount from 1 wt. % to 1.5 wt. % based on the total weight of the silica fume, iron oxide ($Fe_2O_3$) is present in the silica fume in an amount from 1.4 wt. % to 2 wt. % based on the total weight of the silica fume, magnesium oxide (MgO) is present in the silica fume in an amount from 0.2 wt. % to 0.8 wt. % based on the total weight of the silica fume, sodium oxide ($Na_2O$) is present in the silica fume in an amount from 0.5 wt. % to 1.2 wt. % based on the total weight of the silica fume, and potassium oxide ($K_2O$) is present in the silica fume in an amount from 0.5 wt. % to 1.2 wt. % based on the total weight of the silica fume.

In some embodiments, the silica fume has a loss of ignition value of from 1 to 6.

In some embodiments, the additive soil material has a cation exchange capacity of from 80-150 milliequivalents (mEq)/100 grams (g).

In some embodiments, the additive soil material has a specific surface area of 400-900 square meters per gram ($m^2/g$).

In some embodiments, the sulfur is exclusively an elemental sulfur.

In some embodiments, the at least two chemical additives further comprises fly ash.

In some embodiments, the inert sand material has a particle size ranging from 2 mm to 5 mm.

In some embodiments, the silica fume has a specific gravity of from 2 to 3.

In some embodiments, the silica fume has a mean grain size of from 0.1 to 0.5 micrometers ($\mu m$).

The foregoing general description of the illustrative present disclosure and the following The detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
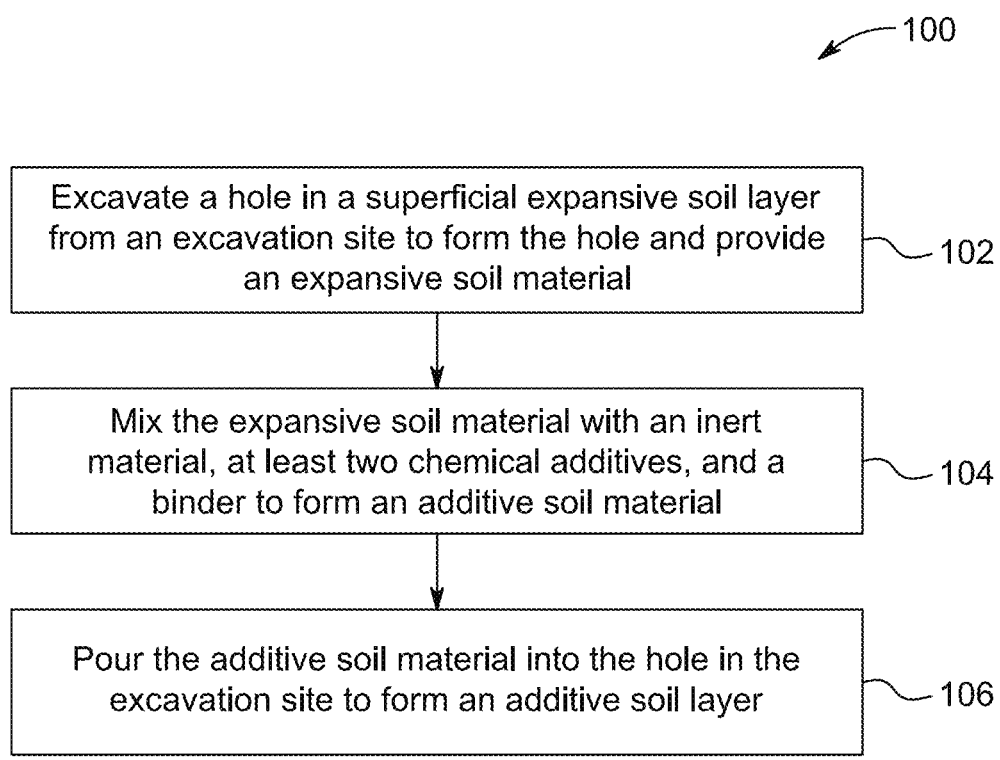
FIG. 1 is a schematic flow diagram of a method for treating expansive soils, according to certain embodiments.

In the drawings, reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "excavating" refers to a process of digging the ground for construction purposes.

As used herein, the term "superficial" refers to a soil layer that is only on the surface, not deep.

As used herein, the term "additives" refers to the substance that is added to the soil in small amounts for stabilization of the soil.

As used herein, the term "inert material" refers to a waste that does not undergo any significant physical, chemical, or biological transformations and is unlikely to adversely affect other matter with which it comes into contact.

As used herein, the term "binder" refers to a material applied to the soil and/or soil surface to permanently or temporarily prevent water-induced erosion of exposed soils on construction sites.

As used herein, the term "undensified" refers to dustless, uniform, smooth, free of lumps, and flows readily for bulk handling applications.

As used herein, the term "ignition value" refers to a minimum temperature required to start or cause combustion, regardless of an igniting element.

As used herein, the term "hygroscopic" refers to a property of a material having a habit of absorbing moisture from the air.

As used herein, the term "organic matter" refers to the carbon-based compounds and compositions found within natural and engineered, terrestrial, and aquatic environments.

As used herein, the term "smectite group" refers to a mineral mixture of various swelling sheet silicates, which have a three-layer 2:1 structure and belong to the clay minerals. Smectites mainly relate to montmorillonite but can often contain secondary minerals such as quartz and calcite.

As used herein, the term "pozzolanic activity" refers to a measure for the degree of reaction over time or the reaction rate between a pozzolan and $Ca^{2+}$ or calcium hydroxide ($Ca(OH)_2$) in the presence of water.

As used herein, the term "fly ash" refers to hydrocarbon (e.g., coal) combustion residuals (CCRs) which are a hydrocarbon, especially coal, combustion product that is composed of particulates (fine particles of burned fuel) that are driven out of coal-fired boilers together with the flue gases.

Embodiments of the present disclosure are directed to a stabilization method for treating expansive soils using chemical additives. The present study helps in elimination of swelling potential of soils, to improve soil strength and soil breaking capacity, to reduce settlement, and to decrease considerable soil permeability. The method includes excavating a superficial expansive soil layer to a medium depth (preferably less than six meters) and mix chemical additives, a binder, and an inert material with the excavated material. The inert material includes a fine to medium well-graded sand, the chemical additives include a sulfur and silica fume, and the binder includes dicyclopentadiene.

Referring to FIG. 1, a schematic flow diagram of the method 100 for treating expansive soils is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

Figure 2:
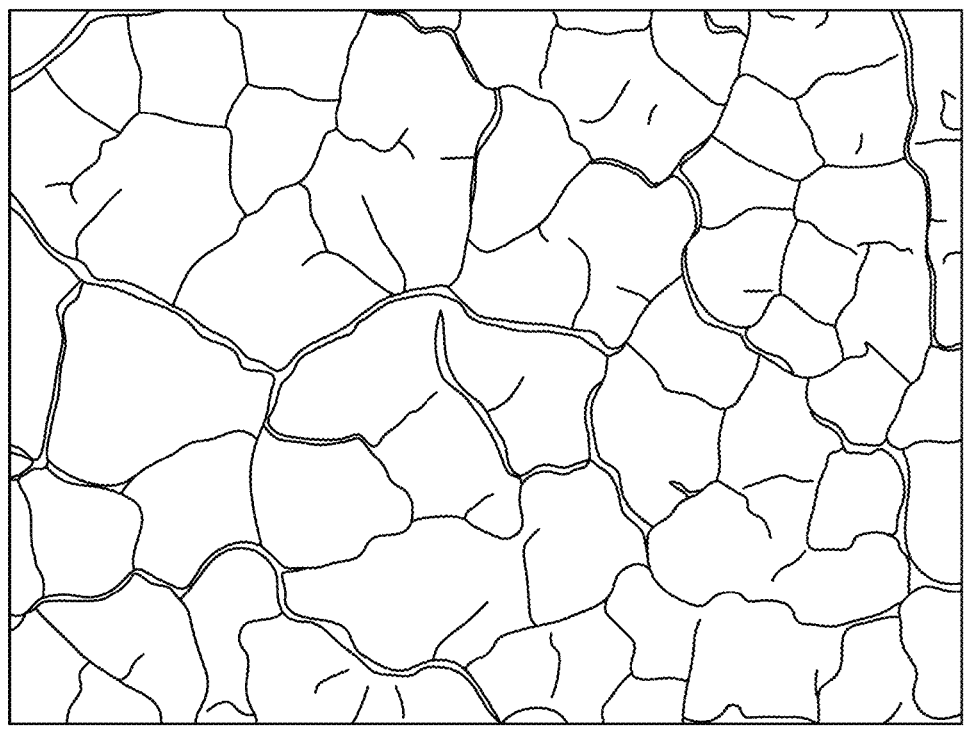
FIG. 2 shows an image of an exemplary expansive soil to be treated by the method of FIG. 1, according to certain embodiments.

At step 102, the method 100 includes excavating a hole in a superficial expansive soil layer from an excavation site to form the hole and provide an expansive soil material. The expansive soil material has the ability to shrink or swell when a change in environment occurs and moisture migration into or out of the soil material results. In some embodiments, the excavating forms a hole having a depth from 1 meter (m) to 6 m. The expansive soils, shown in FIG. 2, are characterized by the presence of clay minerals having an expanding lattice type of inorganic compounds. The clay minerals may be characterized as having very weak van der Waals forces in between the adjacent unit cells of the inorganic compounds. The clay minerals belong to the smectite group materials of which montmorillonite is a member.

Figure 3:
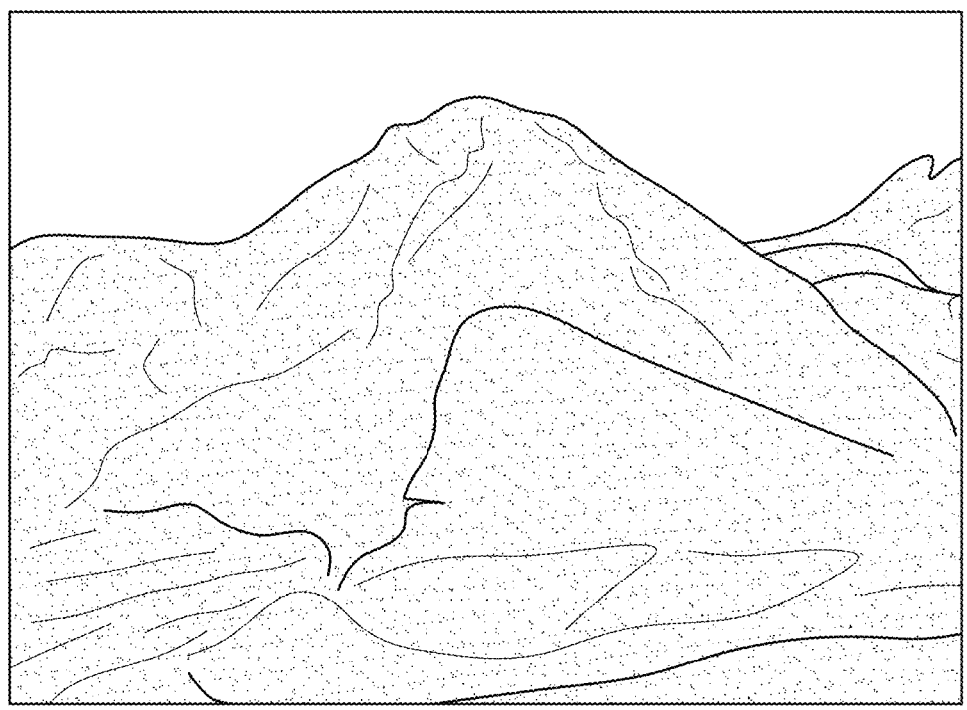
FIG. 3 shows an image of an exemplary sand used as an inert material in the method of treating expansive soils, according to certain embodiments.

At step 104, the method 100 includes mixing the expansive soil material with the inert material, at least two chemical additives, and the binder to form an additive soil material. In some embodiments, the additive soil material has a cation exchange capacity of from 80-150 milliequivalents (meq)/100 g. In some embodiments, the additive soil material has a specific surface area of 400-900 square meters per gram ($m^2/g$). The inert material is preferably a sand, shown in FIG. 3, which is a granular material. According to the present disclosure, the sand is present in the additive soil material in an amount from 30 weight percentage (wt. %) to 40 wt. % based on a total weight of the additive soil material. The sand is made up of fine rock particles and is preferably a washed sand, e.g., a sand washed with water to remove water soluble components such as salts. Further, the sand is a naturally occurring and finely divided rock comprising particles or granules ranging in size from 0.075 to 2 mm. The grains of the sand may be sharp, strong, and angular. The sand may include three categories based on its size: a fine sand, a medium sand, and a coarse sand. In one embodiment, the inert material may be the fine sand and may have a particle size ranging from 0.075 mm to 0.425 mm. In another embodiment, the inert material may be the medium sand which may have a particle size ranging from 0.425 mm to 2 mm. In yet another embodiment, the inert material may be the coarse sand which may have a particle size ranging from 2 mm to 4.75 mm. Silica (silicon dioxide, $SiO_2$) is a common constituent of sand. The silica is preferably in the form of quartz, which, because of its chemical inertness and considerable hardness, is resistant to weathering. In some embodiments, the inert sand material does not include hygroscopic salts, clay, silt, and organic matter.

Figure 4:
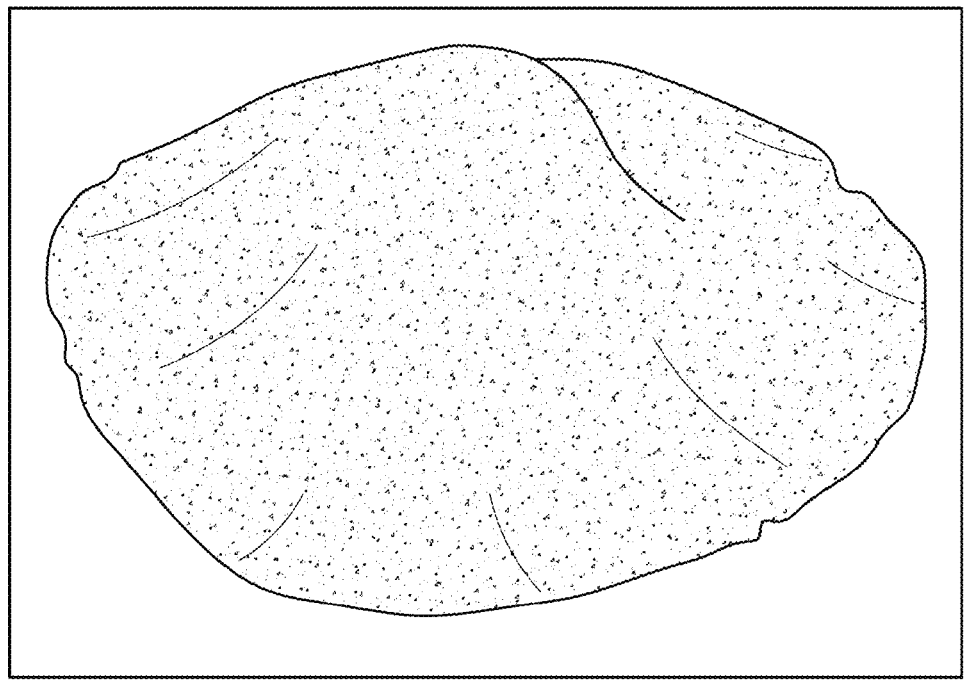
FIG. 4 shows an image of a sulfur used as a chemical additive in the method of treating expansive soils, according to certain embodiments.

According to the present disclosure, the at least two chemical additives are sulfur and a silica fume. The sulfur is present in the additive soil material in an amount from 12 wt. % to 25 wt. % based on the total weight of the additive soil material. In some embodiments, the sulfur is present in the additive soil material in an amount of 25 wt. % based on the total weight of the additive soil material. In some embodiments, the sulfur is exclusively elemental sulfur (FIG. 4). The sulfur in its native form is a yellow crystalline solid and occurs as a pure element or as sulfide ($S^{2-}$) and sulfate ($SO_4^{2-}$) minerals. The crystallography of the sulfur is complex. Depending on the specific conditions, the sulfur may be in the form of allotropes form several distinct crystal structures.

The sulfur-treated soil helps to solidify and strengthen the soil by chemical binding and cooling from molten to solid forms. The sulfur modifies the soil foundation to an upgraded composite ground and reduces the cost of geotechnical work. The sulfur shows varied characteristics as shown in Table 1.

TABLE 1 represents the characteristics of the sulfur.

| | |
|---|---|
| Atomic number | 16 |
| Atomic mass | 32.06 g · $mol^{-1}$ |
| Electro negativity according to Pauling | 2.5 |
| Density | 2.07 g · $cm^{-3}$ at 20 ° C. |

TABLE 1-continued represents the characteristics of the sulfur.

| | |
|---|---|
| Melting point | 113° C. |
| Boiling point | 445° C. |
| Vanderwaals radius | 0.127 nm |
| Ionic radius | 0.184 (−2) nm; 0.029 (+6) |
| Isotopes | 5 |
| Electronic shell | [Ne] $3s^2 3p^4$ |
| Energy of first ionization | 999.3 kJ · $mol^{-1}$ |
| Energy of second ionization | 2252 kJ · $mol^{-1}$ |
| Energy of third ionisation | 3357 kJ · $mol^{-1}$ |
| Standard potential | −0.51 V |

Figure 5:
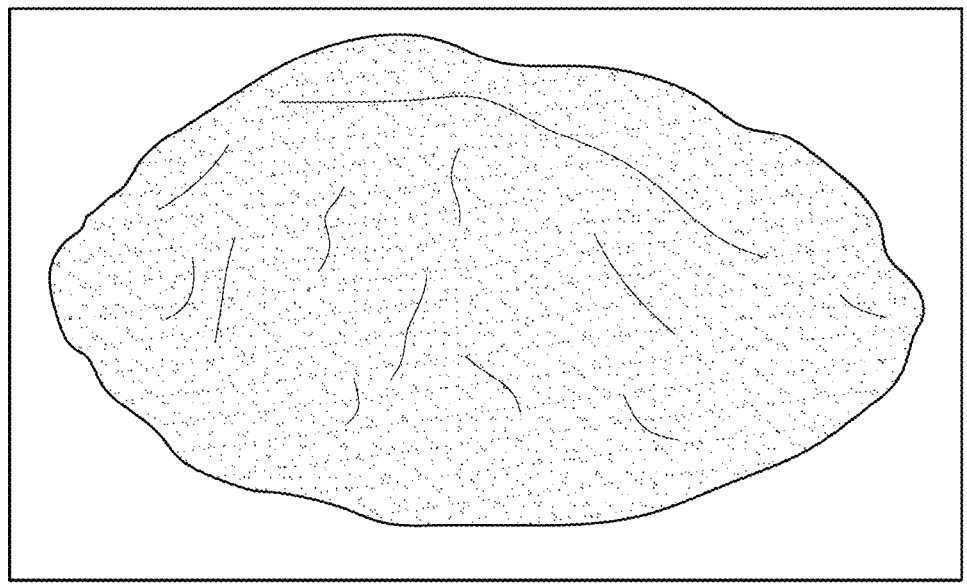
FIG. 5 shows an image of a silica fume used as a chemical additive in the method of treating expansive soils, according to certain embodiments.

FIG. 5 shows an exemplary image of the silica fume which is a by-product of producing silicon metal or ferrosilicon alloys. The silica fume includes primarily amorphous (non-crystalline) $SiO_2$. The silica fume has a large surface area, and the high $SiO_2$ content. According to the present disclosure, the silica fume is undensified. The undensified silica fume is composed of $SiO_2$ wollastonite. The particle characteristics of the undensified silica fume are ultrafine powder. The average particle size of the undensified silica fume is less than 1 micrometer (μm) and has a bulk density of up to about 400 $kg/m^3$, preferably from 200 $kg/m^3$ to 350 or about 300 $kg/m^3$. The undensified silica fume has pozzolanic activity and may be reactive (pozzolanic) because of its chemical and physical properties.

According to the present disclosure, the silica fume has a first phase in which silicon dioxide ($SiO_2$) is present in the silica fume in an amount from 80 wt. % to 90 wt. % based on a total weight of the silica fume. In the present disclosure, the amount of $SiO_2$ is 85 wt. % of the total weight of the silica fume. Aluminum oxide ($Al_2O_3$) may also be present in the silica fume in an amount from 1 wt. % to 1.5 wt. % based on the total weight of the silica fume. In the present disclosure, the amount of $Al_2O_3$ is most preferably 1.12 wt. % of the total weight of the silica fume. Iron oxide ($Fe_2O_3$) is preferably present in the silica fume in an amount from 1.4 wt. % to 2 wt. % based on the total weight of the silica fume. In the present disclosure, the amount of $Fe_2O_3$ is 1.46 wt. % of the total weight of the silica fume. In a preferred embodiment the expansive soil material further comprises $Fe_2O_3$ particles as a separate component. The $Fe_2O_3$ particles preferably have an an average particle size of less than 10 μm, more preferably from 200 nm to 1 μm.

Magnesium oxide (MgO) may also be present in the silica fume in an amount from 0.2 wt. % to 0.8 wt. % based on the total weight of the silica fume. Sodium oxide ($Na_2O$) may also be present in the silica fume in an amount from 0.5 wt. % to 1.2 wt. % based on the total weight of the silica fume. Potassium oxide ($K_2O$) may also be present in the silica fume in an amount from 0.5 wt. % to 1.2 wt. % based on the total weight of the silica fume. In some embodiments, calcium oxide (CaO) may also be present in the silica fume. In some embodiments, the silica fume has a loss of ignition value of from 1 to 6. In some embodiments, the silica fume has a specific gravity of from 2 to 3. In the present disclosure, the silica fume preferably has a specific gravity of 2.22. In some embodiments, the silica fume has a mean grain size of from 0.1 to 0.5 μm. In the present disclosure, the silica fume has the mean grain size of 0.15 μm.

In some embodiments, the at least two chemical additives further include fly ash. In one embodiment, the fly ash includes substantial amounts of silicon dioxide ($SiO_2$) (both amorphous and crystalline). In another embodiment, fly ash includes aluminum oxide ($Al_2O_3$). In yet another embodiment, fly ash includes calcium oxide (CaO). The fly ash includes the mineral compounds in coal-bearing rock strata. The fly ash is used as a lightweight aggregate (LWA). The fly ash may offer many benefits, both economically and environmentally.

Figure 6:
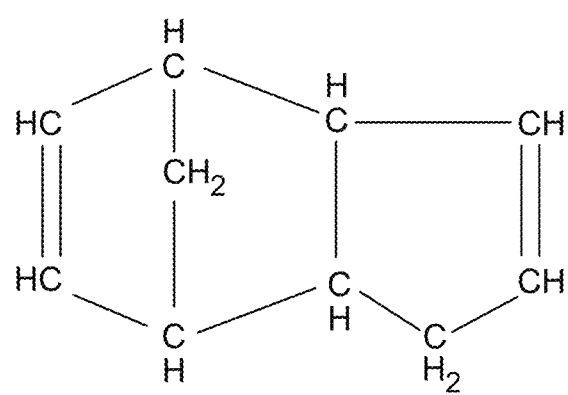
FIG. 6 shows a structure of dicyclopentadiene used as a binder in the method of treating expansive soils, according to certain embodiments.

According to the present disclosure, the binder is a dicyclopentadiene. In some embodiments, the dicyclopentadiene binder is added to the sulfur and/or the silica fume before and/or during the mixing that forms the additive soil material. FIG. 6 shows a chemical structure of the dicyclopentadiene which is a colorless material with a camphor-like odor.

TABLE 2 represents the characteristics of the dicyclopentadiene.

| | |
|---|---|
| Appearance | White crystalline solid or colorless liquid |
| Molecular Formula | $C_{10}H_{12}$ |
| Density | $0.98\ g \cdot cm^{-3}$ |
| Melting point | 32.5° C. |
| Boiling point | 170° C. |
| Chemical Composition | 1,3-cyclopentadiene; Coal Tar; Light benzol |
| Molar Mass | 132.20 g/mol |
| Refractive | n20/D 1.511 |

In some embodiments, the silica fume and the dicyclopentadiene are present in a combined amount of from 35 wt. % to 60 wt. % based on the total weight of the additive soil material. In some embodiments, the dicyclopentadiene binder is added to the sulfur chemical additive once the sulfur chemical additive is molten in a temperature range from 115° C. to 140° C.

At step 106, the method 100 includes adding the additive soil material into the hole in the excavation site to form an additive soil layer. In some embodiments, the method 100 further includes heating the additive soil material in a temperature range from 115° C. to 140° C. before adding/pouring the additive soil material into the hole. In some embodiments, the additive soil material is added in layered increments of 25 centimeters (cm) thick to 100 cm thick. In the present disclosure, the additive soil material is preferably added replaced in layers of 30 cm thick. The additive soil material may have existing moisture content. The treatment of the expansive soil takes place by moderate compaction without water. In some embodiments, the pouring of the additive soil material is conducted in the absence of water.

According to the present disclosure, waste sulfur may be used as a component of the expansive oil material for the stabilization of expansive soils which is efficient compared to the existing solution due to waste disposal and contributions to environmental protection, e.g., formed from hydrodesulfurization of gas and oil. The sulfur exhibits numerous advantages as the stabilization material such as low cost, high availability, excellent physical properties, good chemical compatibility, and good processability. The sulfur stabilization of expansive soils outperforms the conventional stabilization method in terms of rapid gain of early strength, low shrinkage, low thermal conductivity, high durability resistance, and excellent adhesion.

During the treatment process, according to the present disclosure, the excavated expansive soil material is mixed with the sand in an amount of 30 wt. % to 40 wt. %, and the sulfur is added to the mix in a proportion of 12 wt. % to 25 wt. %. The sand is added to alter the expansive soil mineralogy, change its fabric structure, decrease its clay content, and decrease its activity. Particularly, adding 25 wt. % of sulfur to the expansive material will lead to a firm-treated soil similar to a calcareous bedrock.

The expansive soil material may be further heated above the melting point of elemental sulfur (e.g., between 115° C. to 140° C.). Dicyclopentadiene is preferably added to the molten sulfur to inhibit its crystallization and stabilize its polymeric structure. Further, to achieve or acquire high performance of the treated expansive soil material, the silica fume is added or combined with the mix. Particularly, in the additive soil material, the sulfur acts as the chemical stabilization additive, the dicyclopentadiene acts as the binder, and the silica fume acts as strengthening element. After the treatment process, the treated expansive soil material is added into the hole to form the additive soil layer across an area of the hole in the excavation site. Specifically, the additive soil layers of 30 cm thick are placed in the hole incrementally by moderate compaction without water (i.e., at the existing moisture content). As such, the method 100 of the present disclosure eliminates swelling potential of soils, improves soil strength and soil bearing capacity, reduces settlement, and decreases soil permeability.

The dicyclopentadiene preferably undergoes a polymerization reaction at the elevated temperature at which the additive soil material is added to the hole in the expansive soil. Polymerization may proceed by ring opening metathesis polymerization to form a pol(dicyclopentadiene) polymer (poly-DCPD) that is multiply branched and/or cross-linked. In this form the poly-DCPD is insoluble in aqueous and organic liquids. Sulfur present during the polymerization may add across different polymers to further cross-link. The poly-DCPD helps to further stabilize the additive soil material after it is heated and added to the hole.

Numerous modifications and variations of the present disclosure are possible in light of the above teachings. It is therefore to be understood that within the scope of the appended claims, the invention may be practiced otherwise than as specifically described herein.

The invention claimed is:

1. A fly ash treatment method for expansive soil, comprising:
    excavating a superficial expansive soil layer at an excavation site to form a hole having a depth of 1 m to 6 m in the superficial expansive soil layer and provide an expansive soil material;
    mixing the expansive soil material with an inert material, at least two chemical additives, fly ash, and dicyclopentadiene to form an additive soil material;
    heating the additive soil mixture to a temperature of 120-140° C.; and
    adding the additive soil material into the hole at the excavation site to form an additive soil layer;
    wherein the additive soil material is added to the hole in layered increments of from 25 cm thick to 100 cm thick; and
    wherein the inert material is a sand, and the sand is present in the additive soil material in an amount from 30 weight % (wt. %) to 40 wt. % based on a total weight of the additive soil material; and
    wherein the at least two chemical additives are sulfur and a silica fume, wherein the sulfur is present in the additive soil material in an amount from 12 wt. % to 25 wt. % based on the total weight of the additive soil material.

2. The method of claim 1, wherein the additive soil material is added to the hole in the absence of water.

3. The method of claim 1, wherein the additive soil material is heated before the adding the additive soil material to the hole.

4. The method of claim 1, wherein the silica fume and the dicyclopentadiene are present in a combined amount of from 35 wt. % to 60 wt. % based on the total weight of the additive soil material.

5. The method of claim 1, further comprising:
adding the dicyclopentadiene to the sulfur and the silica fume during the mixing of the additive soil material.

6. The method of claim 5, wherein the dicyclopentadiene is added to the sulfur in a molten state.

7. The method of claim 1, wherein the sulfur is present in the additive soil material in an amount of 25 wt. % based on the total weight of the additive soil material.

8. The method of claim 1, wherein the inert material has a particle size ranging from 0.07 mm to 2 mm.

9. The method of claim 1, wherein the additive soil material has a cation exchange capacity of from 80-150 meq/100 g.

10. The method of claim 1, wherein the additive soil material has a specific surface area of from 400-900 $m^2$/g.

11. The method of claim 1, wherein the sulfur is exclusively elemental sulfur.

12. The method of claim 1, wherein the inert material has a particle size ranging from 2 mm to 5 mm.

13. The method of claim 1, wherein the silica fume has a specific gravity of from 2 to 3.

14. The method of claim 1, wherein the silica fume has a mean grain size of from 0.1 to 0.5 µm.

* * * * *